Dec. 20, 1932.    A. C. RAMSAY ET AL    1,891,727
METALLIC TIRE COVER
Filed Oct. 20, 1930    2 Sheets-Sheet 1
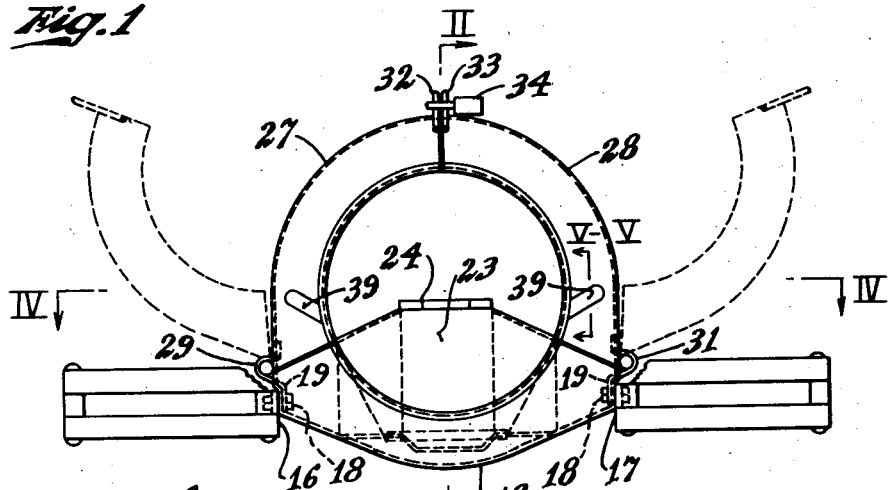
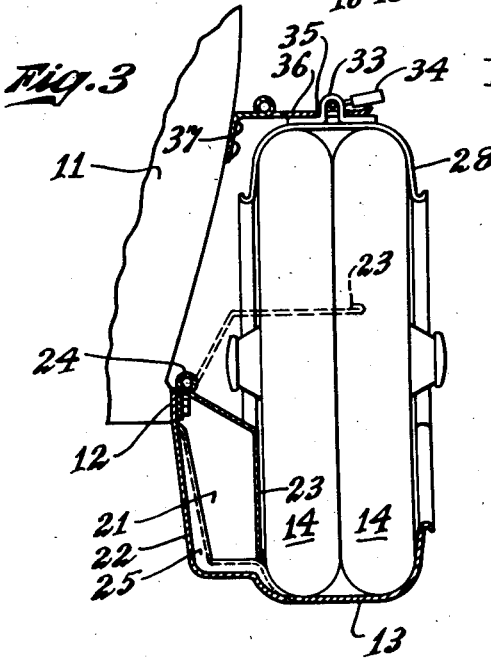
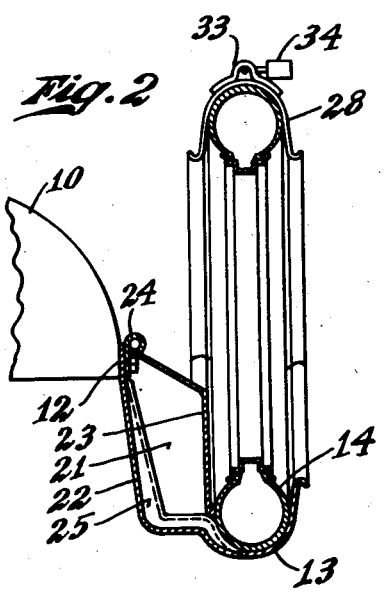
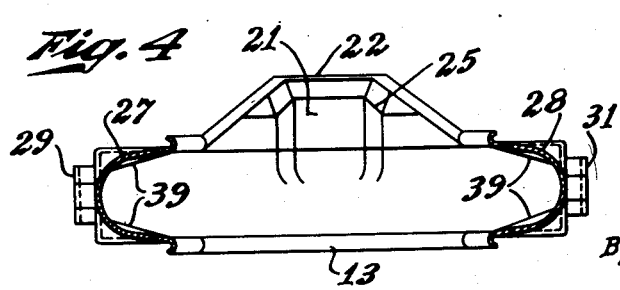
INVENTORS
A. C. Ramsay
R. T. Bagby
By Johnston & Jennings
ATTORNEYS

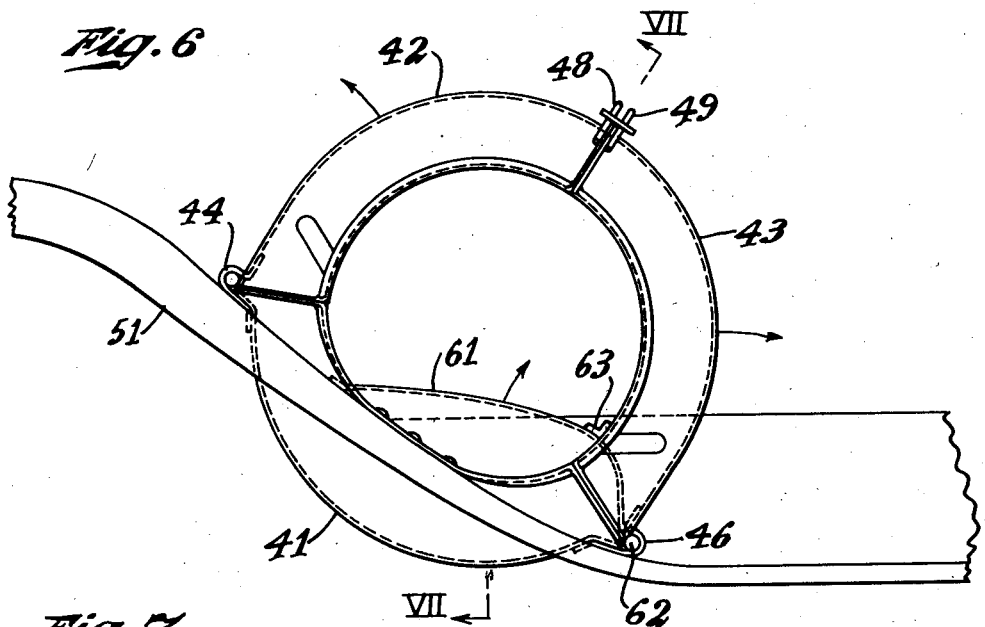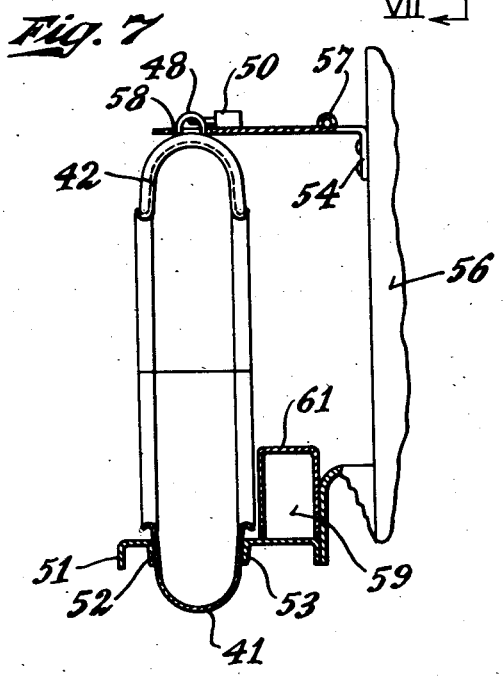

Patented Dec. 20, 1932

1,891,727

UNITED STATES PATENT OFFICE

ANDREW C. RAMSAY AND ROBERT T. BAGBY, OF BIRMINGHAM, ALABAMA

METALLIC TIRE COVER

Application filed October 20, 1930. Serial No. 489,849.

Our invention relates to metallic carriers for pneumatic tires on automobiles, and has for its object the provision of a device of the character designated which shall be simple and sturdy of construction, economical of manufacture, and one in which a pneumatic tire may be readily placed and removed.

A further object of our invention is the provision of a metallic tire cover for pneumatic tires, together with a tool box for carrying tire changing tools and means for simultaneously locking the tool box and the tire carrier.

A still further object of our invention is to provide a sectional concave metallic tire cover and means to secure the same both to the rear of an automobile and to the running board thereof.

Briefly, our invention consists in the provision of a sectional circular concave cover, the sides of which are adapted to fit around the sides of a pneumatic tire for automobiles. The lower section of the carrier is secured to the automobile and two upper sections are hinged to the upper ends of the lower section so that they may be opened out and a tire removed and replaced in the carrier. Means are provided for locking or otherwise fastening the upper ends of the upper sections together. In order to prevent rattling of the carrier, we provide inwardly projecting ridges on the carrier which are adapted to bind against the pneumatic tire when the tire cover is closed.

Another important feature of our invention is the provision of a tool box for carrying tire changing tools and associated with the tire cover. The tool box is provided with a lid which is so arranged that when the tire cover is fastened about a tire, the tool box lid is simultaneously fastened down.

In one form of our invention, we provide means whereby the tire cover, either single or double, is attached to the rear of the automobile body and may be secured to the short bumpers usually provided on the rear of an automobile. In another form of our invention, the tire cover may have its lower section embedded in and secured to the automobile fender along the sides of the automobile.

Apparatus embodying features of our invention is illustrated in the accompanying drawings forming a part of this application, in which:

Fig. 1 is a rear elevational view of our improved tire cover attached to the rear of an automobile;

Fig. 2 is a sectional view taken along the line II—II of Fig. 1;

Fig. 3 is a sectional view similar to Fig. 2 and showing a double carrier adapted for holding tires mounted on spare wheels;

Fig. 4 is a sectional view taken along the line IV—IV of Fig. 1;

Fig. 5 is a sectional view taken along the line V—V of Fig. 1 and showing the inwardly protruding ridges of the tire carrier;

Fig. 6 is an elevational view showing our improved tire carrier mounted on the front side fender of an automobile; and Fig. 7 is a sectional view taken along the line VII—VII of Fig. 6.

Referring to the drawings for a better understanding of our invention, particularly to Figs. 1 to 5 inclusive, we show at 10 in Fig. 2 a fragment of the rear of an automobile body of the roadster or coupé type and at 11 in Fig. 3 is shown another well known type of body in which the rear portion extends more or less vertically above the tire cover. Secured to both types of body at 12 is the lower section of our improved tire cover which lower section comprises a concave arcuate member 13 adapted to fit about the lower portion of an automobile tire 14. Where two tires are carried, with or without wheels, the lower section 13 is made wide enough, as shown in Fig. 3, to fit about two tires in side by side relation. The lower section 13 may also be secured to the rear bumpers at 16 and 17 by means of bolts 18 passing through suitable lugs 19 formed on the lower tire cover section.

On the side of the lower section nearest the car body is provided a tool box 21 formed by a pressed metallic wall 22 joining the lower section 13 and opening thereinto. The tool box is provided with a cover 23 hinged at its upper end at 24 and adapted to be opened to the dotted position shown when the tire cover is opened and the tire removed from in front of the lid. The forward side of the tool box 21 is preferably provided with one or more corrugations 25 in order to add strength thereto.

The upper portion of our improved tire cover comprises arcuate concave members 27 and 28 which are hinged at their lower ends at 29 and 31 to the lower section 13. As will be seen from the drawings, the lower section 13 is less than a semicircle and the upper sections are adapted, in cooperation with the lower section 13, to completely encircle the tire, or tires, with the sides of the arcuate concave members covering the sides of the tires. The upper ends of the members 27 and 28 are provided with loops 32 and 33 which may be locked with a padlock 34. When this is done, it will be seen that the lid 23 of the tool box 21 is simultaneously fastened and locked with the locking of the tire cover.

Where the tire cover is made large enough to accommodate two tires either mounted or unmounted, we preferably provide a hinged strap 36 having one end secured at 37 to the rear of the automobile body 11. The strap is provided with an opening 35 therein adapted to pass over the loops 32 and 33 and be secured in place by the padlock 34 as shown in Fig. 3. This provision adds additional bracing to the tire carrier and serves to prevent excessive vibration.

In order to obviate rattling of the metallic sections when traveling, we form, on the sections 27 and 28, inwardly projecting ridges 39, shown in detail in Fig. 5, which ridges are adapted to bind against the sides of the tires 14 when the sections 27 and 28 are closed.

Referring now to Figs. 6 and 7 we show a modified form of our invention adapted to be mounted in the forward fenders of an automobile. In this modification the tire cover comprises a lower arcuate concave section 41 and upper arcuate concave sections 42 and 43 hinged to the lower section at 44 and 46 and adapted to be secured together by means of loops 48 and 49 and a padlock 50 as in the previous modification described. In this modification, the fender 51 of the automobile is cut out to form an opening 52 having a downwardly turned flange 53 which opening is adapted to house the lower section 41 of the tire carrier, said section being secured to the down turned flange 53 in any suitable manner.

At 54 is shown a strap secured to the side of the automobile body 56 and which is hinged at 57. This strap member extends laterally and has its outer end provided with an opening 58 adapted to fit over the loops 48 and 49 when the tire cover is locked and closed so as to form a lateral bracing for the upper section of the tire carrier.

Associated with the tire carrier shown in Figs. 6 and 7 is a metallic tool box 59 having a cover 61 hinged at 62 to the side of the lower section 41 of the tire carrier. Secured to the top of the cover 61 and extending transversely thereof is an angle member 63 which is adapted to be engaged by the upper section 43 to hold the tool box closed when the sections 42 and 43 are closed about a tire and locked in place. It will thus be seen that with either modification of our invention, the tool box is simultaneously locked with the locking of the tire cover sections.

It will be seen from the foregoing that we have provided an improved metallic tire cover which is simple and sturdy of construction and one in which a tire is securely held so as to obviate rattling. The concave sides of the carrier protect a tire from air and sunlight, which, as is well known, are the principal causes of deterioration of pneumatic tires. It will furthermore be seen that our tire cover is so constructed as to be readily applicable to the rear of an automobile and in the side fenders thereof.

While we have shown our invention in but two forms, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What I claim is:

1. In a metallic tire cover, a lower arcuate, concave member, less than a semicircle, and adapted to fit about the lower portion of a tire, a pair of similar arcuate concave members hinged to the upper ends of the lower member and adapted to encircle the upper portion of the tire, a tool box disposed alongside the lower concave member, a lid for the tool box, means for locking the upper ends of the upper concave members about a tire, and means automatically effective upon so locking said members to lock the tool box.

2. In a metallic tire cover, a lower arcuate, concave portion, less than a semicircle, adapted to fit about the lower portion of a tire, means for securing said lower portion to an automobile, a pair of upper arcuate concave portions hinged to the lower portion and in cooperation therewith adapted to completely encircle the tire, inwardly extending ridges on the upper portion adapted to bind against the tire and prevent rattling, a tool box secured to the automobile and disposed alongside the lower portion, and means for simultaneously locking the tire cover and the tool box by locking said upper portions together.

3. A metallic tire cover for pneumatic tires comprising a sectional concave member adapted to encircle and fit about the sides of a tire, a tool box formed on the side of the lower section, a lid for the tool box hinged to the upper outer side of the tool box and extending inwardly and downwardly of the tire carrier in a position to be engaged and held closed by a tire in the cover, and means for fastening the sections together.

4. A metallic tire cover comprising a lower concave section adapted to partially embrace and to cover a portion of a pneumatic tire, a tool box formed of metal in one side of the lower section and merging with said section, a cover for the tool box hinged to the outer side wall thereof and extending inwardly and downwardly toward the lower concave section in position to be engaged by a tire, a pair of upper arcuate concave sections hinged to the lower section and adapted, in cooperation with the lower section, to completely encircle and to cover the sides of a tire, and means to lock the upper ends of the upper sections together.

5. A metallic tire cover comprising a lower arcuate concave section, an automobile fender, means for positioning and securing said section in the fender, a pair of upper arcuate concave sections hinged to the lower section and adapted in cooperation with said lower section to encircle a tire and cover the sides thereof, means for fastening the upper sections together at the upper ends thereof, a tool box disposed alongside the lower section, and means operable upon fastening the upper sections together for fastening the tool box.

6. A metallic tire cover comprising a lower arcuate concave section, an automobile fender, means for positioning and securing said section in the fender, a pair of upper arcuate concave sections hinged to the lower section and adapted in cooperation with said lower section to encircle a tire and cover the sides thereof, means for fastening the upper sections together at the upper ends thereof, a tool box disposed alongside the lower section, and a lug carried by the tool box and positioned to be engaged by one of the upper sections when said sections are fastened together and hold the tool box closed.

In testimony whereof we affix our signatures.

ANDREW C. RAMSAY.
ROBERT T. BAGBY.